Nov. 3, 1931.   J. BOCA   1,830,733
HOOD HINGE MOLDING
Filed July 3, 1929
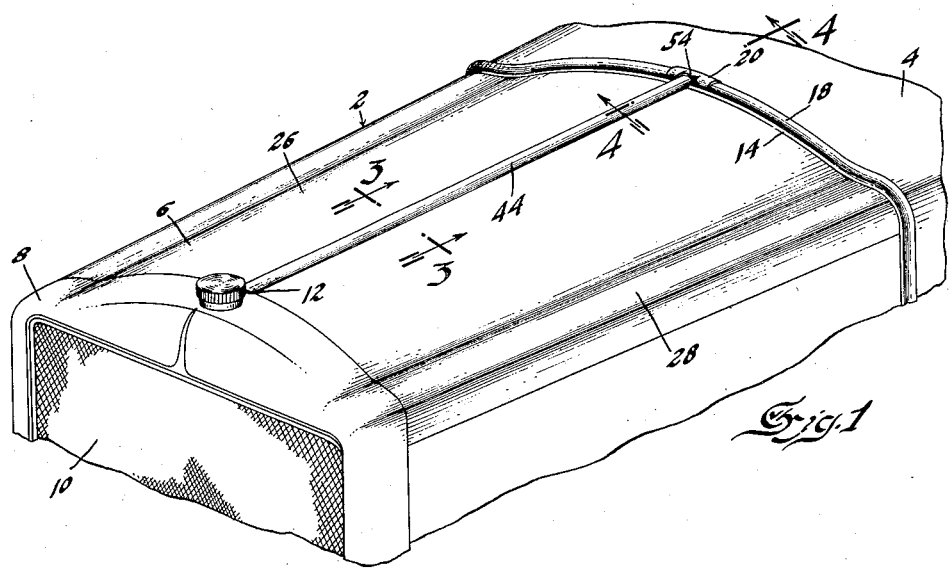
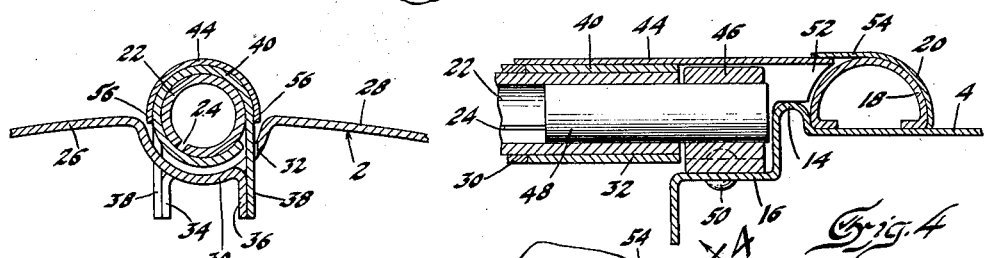
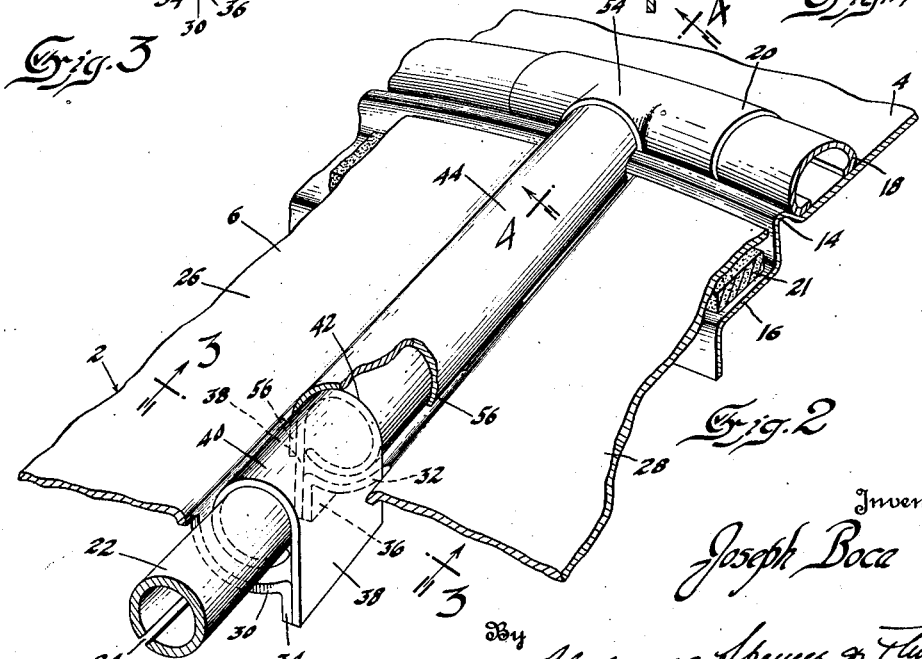
Inventor
Joseph Boca Patented Nov. 3, 1931

1,830,733

UNITED STATES PATENT OFFICE

JOSEPH BOCA, OF FLINT, MICHIGAN, ASSIGNOR TO GENERAL MOTORS CORPORATION, OF DETROIT, MICHIGAN, A CORPORATION OF DELAWARE

HOOD HINGE MOLDING

Application filed July 3, 1929. Serial No. 375,788.

This invention relates to vehicles and has particular reference to a covering for the hinge joint of the hood of an automotive vehicle.

The hoods of modern automotive vehicles usually comprise two lateral sections which are hinged together at the top of the hood. The hinge is composed of a number of similar interfitting sections which pivot about a hinge rod and in its final appearance leaves exposed the joint which is rather unsightly. It is the object of the present invention to provide a simple and neat covering which will conceal the hinge and improve the appearance of the hood.

The object of the invention is accomplished by snapping or slipping over the hinge joint a bead or channel member the shape of which preferably conforms to the shape of the hinge joint. At its rear end the bead or channel member is preferably positioned beneath a bead or finishing strip secured to the cowl. The front end of the strip has preferably no securing means other than that of the inherent spring friction produced by the gripping or snap action after forcing or pressing the bead into place.

On the drawings:

Fig. 1 is a perspective view of a portion of an automotive vehicle sufficient to illustrate the invention.

Fig. 2 is an enlarged detail perspective view of a portion of Fig. 1 illustrating the invention on a larger scale.

Fig. 3 is a section taken transversely through the hinge on the line 3—3 of Figs. 1 and 2.

Fig. 4 is a section on the lines 4—4 of Figs. 1 and 2.

Referring to the drawings the numeral 2 indicates an automotive vehicle as a whole. The vehicle includes the cowl 4, hood 6, radiator shell 8, radiator 10 and filler cap 12. The cowl 4 has its edge suitably beaded as shown at 14 and suitably flanged as at 16. Adjacent the bead 14 there is secured to the cowl the bead or finishing strip 18 at the central mid portion of which a T-shaped finishing portion 20 is applied. The hood 6 is spaced from the flange 16 by means of the felt strips 21.

Between the cowl 4 and the radiator shell 8 there extends the hinge rod 22 which is preferably circular and formed of a single strip or sheet of metal. The ends of the metal are indicated by the split shown at 24.

Suitably hinged to the hinge rod 22 are the sections or halves 26 and 28 of the hood 6. Each hood half 26 and 28 is suitably formed at its hinged edge with a plurality of tongues 30 and 32 which have a flange 34 or 36 at their ends. The tongues 30 are suitably rounded as shown in Fig. 2 to fit about the hinge rod 22. Secured to the flanges 34 and 36 are the flat portions of the clip members 38, each of which has its end formed into a circular portion as indicated at 40. This circular portion is received about the hinge rod 22 and forms the pivot for the hood halves 26 and 28.

By referring to Fig. 2 it will be seen that if no means were provided to cover the hinge, a plurality of separations, cracks or spaces would appear at the junctions 42 between the cylindrical portions 40 of the clips 38. These cracks would leave a rather unsightly appearance and the invention therefore uses the bead or channel shaped member 44 which extends from the cowl 4 to the radiator shell 8 over the entire hinge to cover the same.

Referring to Fig. 4, it will be seen that the flange 16 of the cowl has mounted thereon at its midportion the block 46 which has an opening to receive a bolt 48 which is also received into the end of the hinge rod 22 to hold the same. The block 46 is secured to the flange 16 by means of the rivets 50. The end of the bead or channel member 44 is reduced as shown at 52 and extends under the leg 54 of the T-shaped member 20 to rigidly hold the rear end of the bead or channel 44 in position. If desired the reduced portion 52 may be omitted and the bead 44 abut the end of the arm or leg 54 of the T. At its front end it may be provided with a suitable securing means to extend under the rod 22, but in practice no such means is needed or provided.

By referring to Fig. 3 it will be seen that the bead or channel 44 extends over the cylindrical portions 40, and the ends or edges 56 extend beyond a diameter line of the hinge rod 22. It is only necessary to extend the edges beyond the diameter a distance sufficient for the edge to firmly grip or have a tight frictional contact with the rounded portions of the clips 38.

The sides of the channel have an inherent spring action and to apply the bead the reduced end 52 is first inserted under the leg 54 of the T and the remainder of the bead or channel is pressed or forced onto the hinge joint by a snap or spring action. The spring tension on the sides of the bead 44 will be ample to hold the entire bead or channel on the hinge joint. The ends or edges 56 are bent somewhat inwardly before the bead is applied to insure proper gripping action.

When either of the hood halves 26 or 28 is swung on its hinge to raise the hood section its arc of movement will be limited by the contact of the flat part of the clip 38 with the edge 56 of the bead. This arc however is ample to permit of a full raising of a hood section through greater than 90°.

I claim:

1. In a covering for the hinge joint of the hood of a vehicle, a finishing strip at the junction of the hood with the vehicle cowl, a hood section mounted to swing on the hinge joint, and a cover over said joint having one of its ends positioned under said strip.

2. In a covering for the hinge joint of the hood of a vehicle, a hood section adapted to swing on the hinge joint, and a channel member rigidly secured to the vehicle at one end and removably retained at its other end and extending over said joint and secured to the same by a snap action to conceal the joint.

In testimony whereof I affix my signature.

JOSEPH BOCA.